US011126740B2

(12) United States Patent
Havewala et al.

(10) Patent No.: US 11,126,740 B2
(45) Date of Patent: Sep. 21, 2021

(54) STORAGE ISOLATION FOR CONTAINERS

(71) Applicant: Microsoft Technology Licensing, LLC, Redmond, WA (US)

(72) Inventors: Sarosh C. Havewala, Redmond, WA (US); Christian Gregory Allred, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 35 days.

(21) Appl. No.: 15/628,089

(22) Filed: Jun. 20, 2017

(65) Prior Publication Data

US 2018/0129821 A1  May 10, 2018

Related U.S. Application Data

(60) Provisional application No. 62/417,884, filed on Nov. 4, 2016.

(51) Int. Cl.
| | |
|---|---|
| *G06F 21/62* | (2013.01) |
| *G06F 16/11* | (2019.01) |
| *G06F 16/182* | (2019.01) |
| *G06F 21/53* | (2013.01) |
| *G06F 16/188* | (2019.01) |

(Continued)

(52) U.S. Cl.
CPC ........ *G06F 21/6227* (2013.01); *G06F 3/0644* (2013.01); *G06F 3/0664* (2013.01); *G06F 9/455* (2013.01); *G06F 16/116* (2019.01); *G06F 16/182* (2019.01); *G06F 16/188* (2019.01); *G06F 21/53* (2013.01); *G06F 3/0602* (2013.01)

(58) Field of Classification Search
CPC .. G06F 21/6227; G06F 16/182; G06F 16/188; G06F 16/116; G06F 3/0644; G06F 3/0664; G06F 9/455; G06F 21/53; G06F 3/06
USPC ......................................................... 726/26
See application file for complete search history.

(56) References Cited

U.S. PATENT DOCUMENTS

| | | | |
|---|---|---|---|
| 5,729,710 A | * | 3/1998 | Magee .................... G06F 9/544 711/203 |
| 6,341,341 B1 | | 1/2002 | Grummon et al. |

(Continued)

OTHER PUBLICATIONS

Vokorokos, et al., "Application Security through Sandbox Virtualization", In Journal of Acta Polytechnica Hungarica, vol. 12, No. 1, 2015, pp. 83-101.

(Continued)

*Primary Examiner* — Mohammad W Reza
*Assistant Examiner* — Moeen Khan

(57) ABSTRACT

An application running in a container is able to access files stored on disk via normal file system calls, but in a manner that remains isolated from applications and processes in other containers. In one aspect, a namespace virtualization component is coupled with a copy-on-write component. When an isolated application is accessing a file stored on disk in a read-only manner, the namespace virtualization component and copy-on-write component grant access to the file. But, if the application requests to modify the file, the copy-on-write component intercepts the I/O and effectively creates a copy of the file in a different storage location on disk. The namespace virtualization component is then responsible for hiding the true location of the copy of the file, via namespace mapping.

18 Claims, 12 Drawing Sheets

(51) Int. Cl.
*G06F 9/455* (2018.01)
*G06F 3/06* (2006.01)

(56) References Cited

U.S. PATENT DOCUMENTS

| | | | |
|---|---|---|---|
| 7,886,291 B1* | 2/2011 | Jones | G06F 21/53 |
| | | | 707/822 |
| 8,984,629 B2 | 3/2015 | Kim et al. | |
| 9,075,638 B2 | 7/2015 | Barnett et al. | |
| 2005/0257266 A1* | 11/2005 | Cook | G06F 8/61 |
| | | | 726/23 |
| 2008/0301676 A1 | 12/2008 | Alpern et al. | |
| 2009/0271412 A1* | 10/2009 | Lacapra | H04L 67/104 |
| 2010/0036889 A1* | 2/2010 | Joshi | G06F 16/182 |
| | | | 707/821 |
| 2011/0040812 A1* | 2/2011 | Phillips | G06F 9/45541 |
| | | | 707/822 |
| 2012/0233117 A1 | 9/2012 | Holt et al. | |
| 2013/0226931 A1 | 8/2013 | Hazel | |
| 2014/0040331 A1 | 2/2014 | Takaoka et al. | |
| 2016/0098285 A1* | 4/2016 | Davis | G06F 9/45545 |
| | | | 718/1 |
| 2016/0335074 A1 | 11/2016 | Olivier et al. | |
| 2017/0168936 A1 | 6/2017 | Chandrashekar et al. | |
| 2017/0220598 A1 | 8/2017 | Lu et al. | |
| 2017/0249469 A1* | 8/2017 | Goyal | G06F 21/62 |

OTHER PUBLICATIONS

"Memory Sharing Among Containers and Copy-on-Write Protection", http://download.swsoft.com/pvc/60/win/docs/en/Parallels%20Containers%20for%20Windows%20User's%20Guide/19930.htm, Retrieved on: Sep. 29, 2016, 2 pages.

"Understand images, containers, and storage drivers", https://web.archive.org/web/20151107020508/http:/docs.docker.com/engine/userguide/storagedriver/imagesandcontainers/, Published on: Nov. 7, 2015, 17 pages.

"Introduction to Container Security", In Whitepaper of Docker, Mar. 18, 2015, pp. 1-7.

Mavungu, Eddy, "Docker Storage: An Introduction", https://deis.com/blog/2016/docker-storage-introduction/, Published on: Jul. 22, 2016, 3 pages.

Wu, et al., "TotalCOW: Unleash the Power of Copy-On-Write for Thin-provisioned Containers", On Proceedings of 6th Asia-Pacific Workshop on Systems, Jul. 27, 2015, 7 pages.

Sonone, et al., "On Exploiting Page Sharing in a Virtualized Environment—an Empirical Study of Virtualization Versus Lightweight Containers", In Proceedings of IEEE 8th International Conference on Cloud Computing, Jun. 27, 2015, 8 pages.

Kasireddy, Preethi, "A Beginner Friendly Intro to Containers, VM and Docker", https://www.linkedin.com/pulse/beginner-friendly-intro-containers-vm-docker-preethi-kasireddy, Published on: Apr. 13, 2016, 12 pages.

"AUFS Storage Driver in Practice", Retrieved from <<https://web.archive.org/web/20160305021439/https://docs.docker.com/engine/userguide/storagedriver/aufs-driver/>>, Mar. 5, 2016, 15 Pages.

"OverlayFS Storage in Practice", Retrieved From <<https://web.archive.org/web/20160305024221/https://docs.docker.com/engine/userguide/storagedriver/overlayfs-driver/>>, Mar. 5, 2016, 17 Pages.

"Understand the Architecture", Retrieved From <<https://web.archive.org/web/20151107020152/http://docs.docker.com:80/engine/introduction/understanding-docker/>>, Nov. 7, 2015, 14 Pages.

"International Search Report and Written Opinion Issued in PCT Application No. PCT/US2017/058385", dated Feb. 15, 2018, 13 Pages.

Nickoloff, Jeff, "Docker in Action", Retrieved from <<http://pepa.holla.cz/wp-content/uploads/2016/10/Docker-in-Action.pdf>>, Mar. 27, 2016, Part 1, 46 Pages.

Nickoloff, Jeff, "Docker in Action", Retrieved from <<http://pepa.holla.cz/wp-content/uploads/2016/10/Docker-in-Action.pdf>>, Mar. 27, 2016, Part 2, 64 Pages.

Nickoloff, Jeff, "Docker in Action", Retrieved from <<http://pepa.holla.cz/wp-content/uploads/2016/10/Docker-in-Action.pdf>>, Mar. 27, 2016, Part 3, 55 Pages.

Nickoloff, Jeff, "Docker in Action", Retrieved from <<http://pepa.holla.cz/wp-content/uploads/2016/10/Docker-in-Action.pdf>>, Mar. 27, 2016, Part 4, 47 Pages.

Nickoloff, Jeff, "Docker in Action", Retrieved from <<http://pepa.holla.cz/wp-content/uploads/2016/10/Docker-in-Action.pdf>>, Mar. 27, 2016, Part 5, 39 Pages.

Nickoloff, Jeff, "Docker in Action", Retrieved from <<http://pepa.holla.cz/wp-content/uploads/2016/10/Docker-in-Action.pdf>>, Mar. 27, 2016, Part 6, 55 Pages.

"Final Office Action Issued in U.S. Appl. No. 15/629,301", dated Oct. 2, 2019, 24 Pages.

"Non Final Office Action Issued in U.S. Appl. No. 15/629,301", dated Jul. 1, 2019, 20 Pages.

"Non Final Office Action Issued in U.S Appl. No. 15/629,301", dated Jun. 23, 2020, 25 Pages.

"Office Action Issued in European Patent Application No. 17798048.9", dated Jun. 23, 2021, 8 Pages.

* cited by examiner

STORAGE ISOLATION FOR CONTAINERS

CROSS-REFERENCE TO RELATED APPLICATIONS

This application claims the benefit of U.S. Provisional Patent Application No. 62/417,884, filed on Nov. 4, 2016, titled "Storage Isolation for Containers," the content of which is hereby incorporated by reference in its entirety.

BACKGROUND

Containers are a type of virtualization technology that allow numerous applications to run under a common host operating system while remaining completely isolated from one another. This isolation ensures that any processes inside the container cannot see any processes or resources outside of the container. In contrast to isolation methods provided by virtual machines, containers do not require the use of a hypervisor, and instead use the process isolation and file system features associated with the operating system kernel. Because of this, containers may offer benefits over virtual machines, such as smaller storage requirements and reduced start-up times. Applications and processes within containers may interact with the host file system and operating system via numerous file system calls.

SUMMARY

Disclosed are techniques for an application running in a container to access files stored on disk via normal file system calls, but in a manner that remains isolated from applications and processes in other containers. In one aspect, a namespace virtualization component is coupled with a copy-on-write component. When an isolated application is accessing a file stored on disk in a read-only manner, the namespace virtualization component and copy-on-write component grant access to the file. But, if the application requests to modify the file, the copy-on-write component intercepts the I/O and effectively creates a copy of the file in a different storage location on disk. The namespace virtualization component is then responsible for hiding the true location of the copy of the file, via namespace mapping. As a result, it appears to the application as if the application is accessing and writing to the resource it requested, but it is actually operating on a copy of the file.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

Figure 9A:
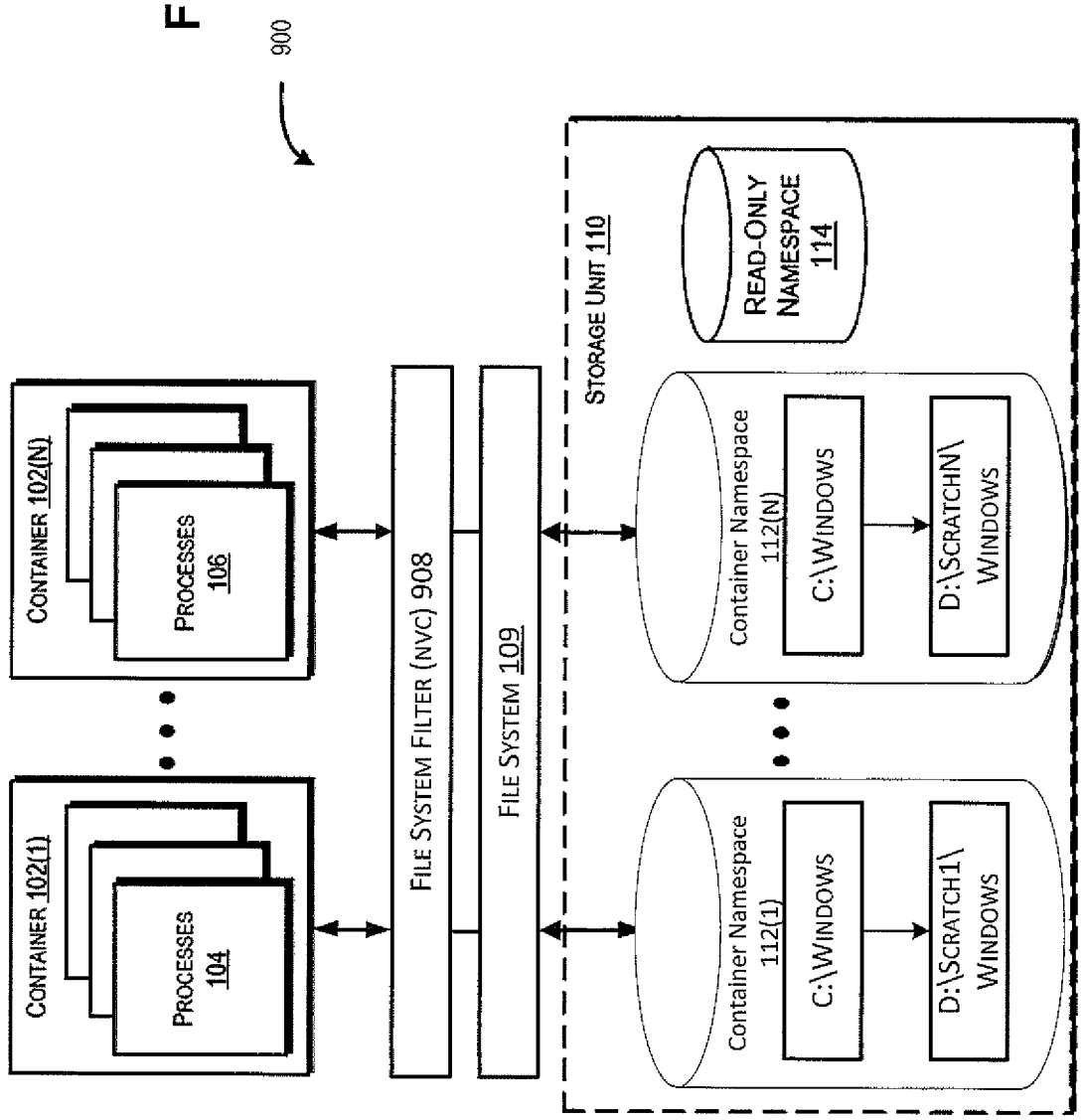
FIG. 9A is a block diagram depicting an example environment in which a namespace virtualization component virtualizes the location of the content of a scratch layer.
Figure 9B:
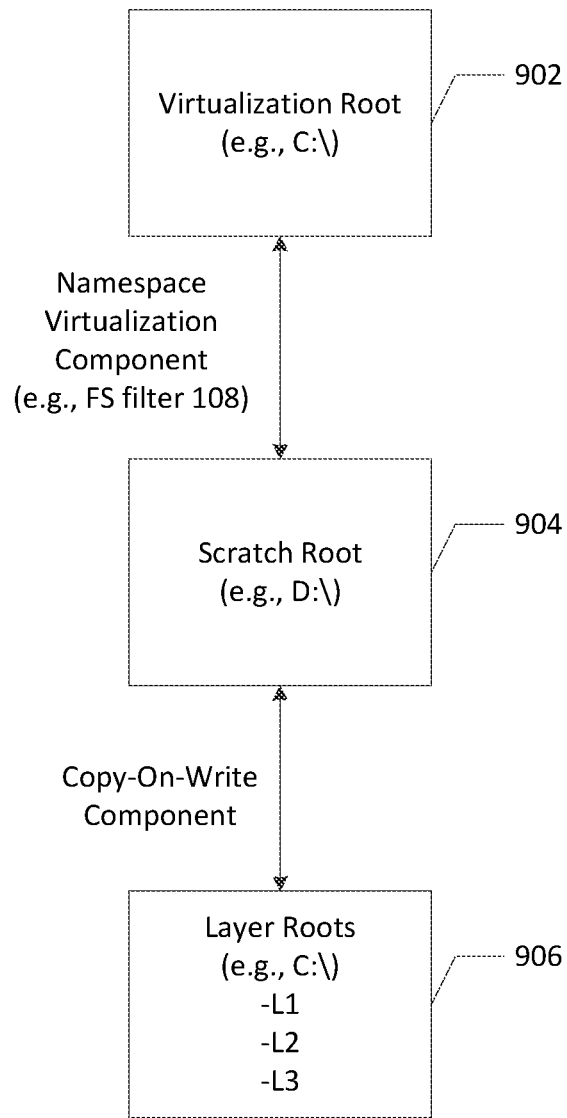

FIG. 9B graphically illustrates the relationship between a virtualization root, scratch root, and layer roots, in accordance with the example environment illustrated in FIG. 9A.

Figure 9C:
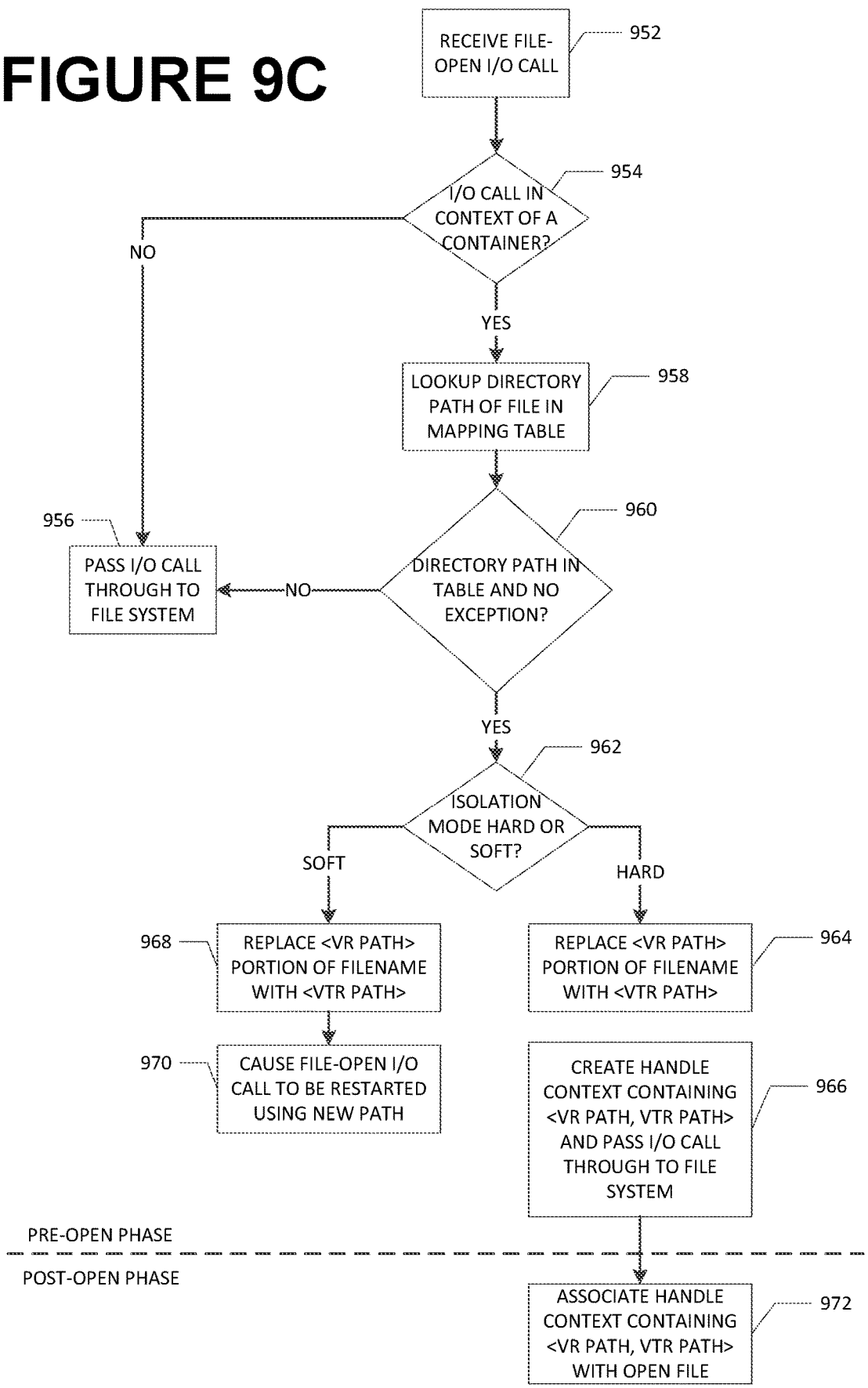

FIG. 9C illustrates one embodiment of a process of redirecting a file-open I/O call from a virtualization target to a virtualization target root.

Figure 10:
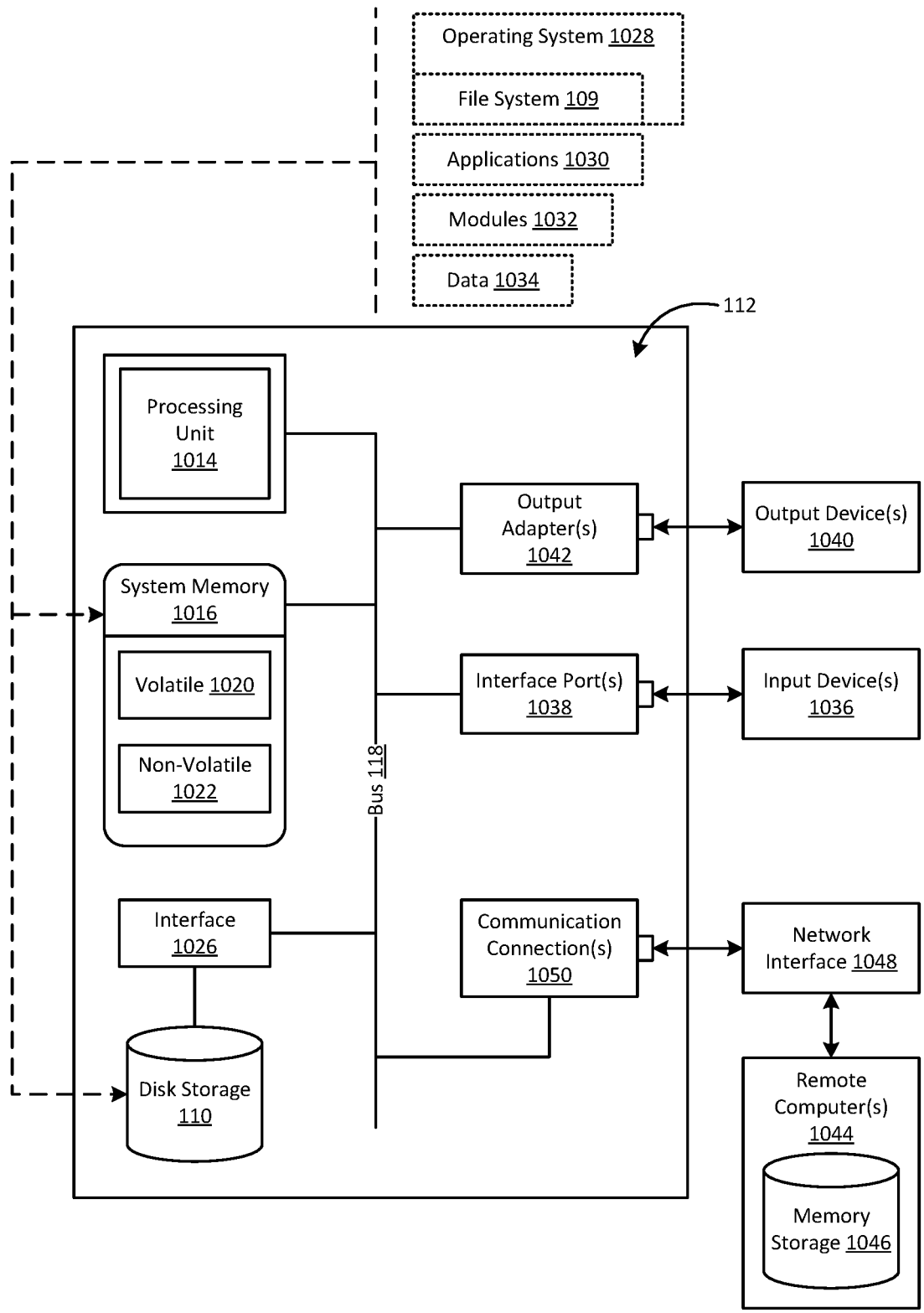

FIG. 10 illustrates an exemplary computing device, in which the aspects disclosed herein may be employed.

DETAILED DESCRIPTION OF ILLUSTRATIVE EMBODIMENTS

The techniques and systems described herein enable an application running in a container to access files stored on disk via normal file system calls, but in a manner that remains isolated from applications and processes in other containers. In various examples, a container comprises an isolated resource control mechanism from which one or more processes (e.g., processes that comprise an application) can execute without affecting other system or host infrastructure outside the container. A container can run some components of an operating system (often a subset of operating system components), a container can have its own file system namespace, and/or a container can be accessed over a network as if it were a physical computer system (e.g., a computer system that executes in isolation).

As described above, a container relies upon access to files (e.g., executables, binaries, etc.) to execute the processes contained in the container. In some instances, a container may be associated with a job. In one embodiment, a container may have its own container namespace (e.g., storage volume) on a storage resource (e.g., a server in a data center). A container namespace provides a view, to the container, of the files.

The techniques and systems described herein reduce the amount of storage resources consumed by containers by creating placeholder files in container namespaces. The placeholder files are associated with read-only access to corresponding shared files stored in a read-only namespace. The read-only namespace can be accessible to multiple different containers. This increases the storage density for a storage unit because more containers can be executed from the same storage unit. The techniques and systems described herein further reduce the amount of storage resources consumed by containers by creating placeholder directories. The techniques and systems described herein also reduce the amount of storage resources consumed by containers to execute files by using a shared execution memory area.

Figure 1:
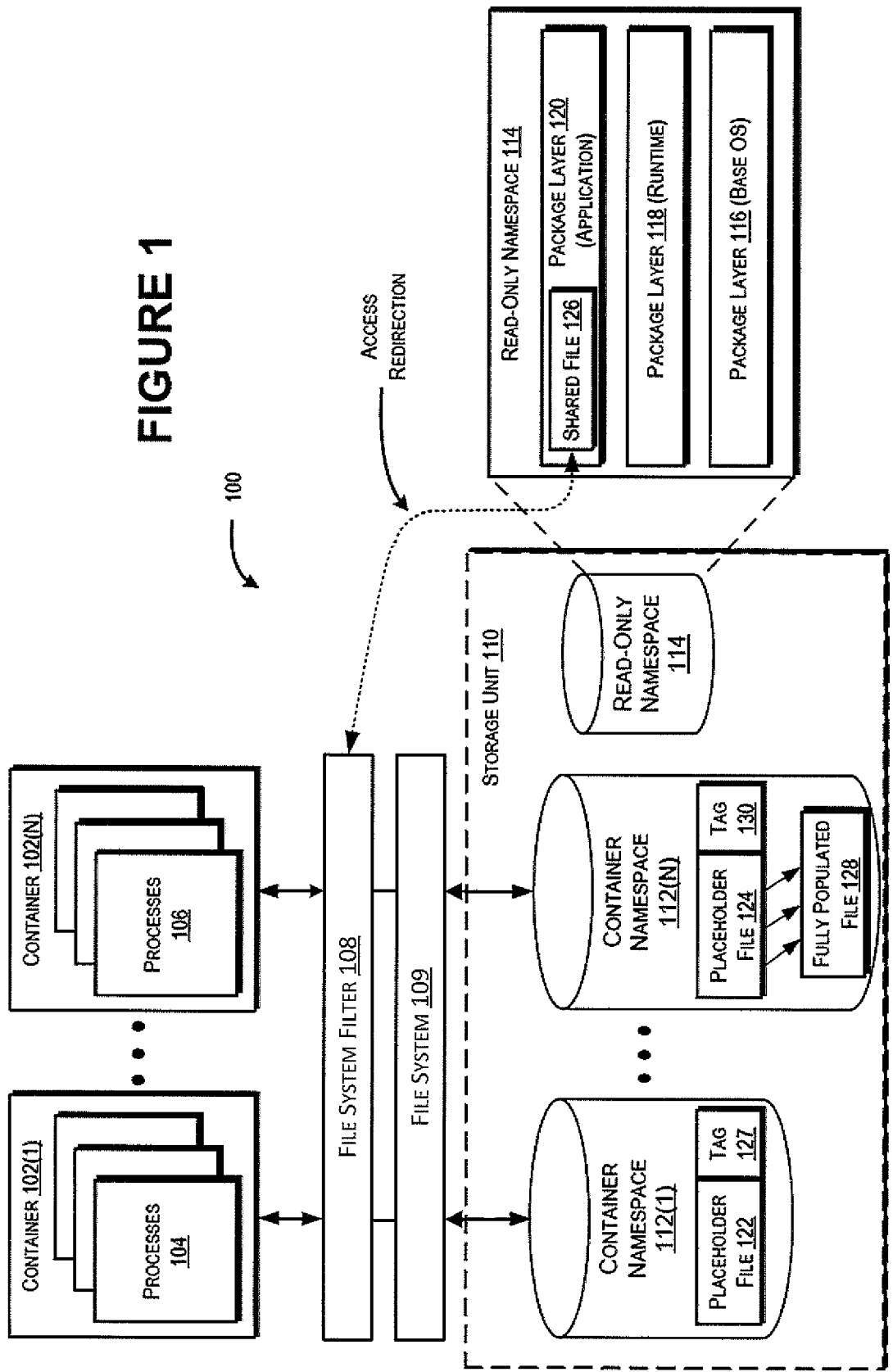
FIG. 1 is a block diagram depicting an example environment for creating placeholder files in container namespaces.

FIG. 1 is a block diagram depicting an example environment, or virtualization system, 100 for creating placeholder files in container namespaces. FIG. 1 illustrates multiple containers 102(1) . . . 102(N), where N represents a number of containers (e.g., run by a host computing device such as that shown in FIG. 10). Container 102(1) includes one or more processes 104 and container 102(N) includes one or more processes 106. FIG. 1 further illustrates a file system filter 108 and a file system 109 configured between the containers 102(1) . . . 102(N) and a storage unit 110. The file system filter 108 may be part of a file system stack of the file system 109 and may be configured to perform special handling of certain input/output (I/O) calls. For example, an application (e.g., a process 104) may perform file operations (e.g., create, open, read, write) by invoking an appropriate I/O call via an application programming interface (API) of the file system 109 or underlying operating system of a computing device. These I/O calls will be passed to the file system's stack, which may comprise one or more file system filters, such as file system filter 108. In one implementation, initially, an I/O call will pass through these filters to the file system 109 itself. The target of the I/O call may have special handling instructions associated with it (for example, in the form of a tag and related data), which the file system 109 may detect, causing the file system to pass the I/O call back up the stack for special handling by one of the file system filters, such as file system filter 108. The tag associated with the target of the I/O call may identify the appropriate file system filter to provide the special handling. An example of such special handling functionality is Microsoft's NTFS reparse point technology. In the case of Microsoft's NTFS reparse point technology, if the file system accesses a file on disk that contains a reparse point data structure (comprising a tag and related data/instructions for special handling), the file system will pass the I/O request back up the file system filter stack. A file system filter that corresponds to the tag (i.e., globally unique identifier) of the reparse point will recognize the I/O as relating to a file whose access is to be handled by that filter. The filter will process the I/O and then pass the I/O back to the file system for proper handling as facilitated by the filter. In the case of placeholder files described herein, the file system will pass the I/O request back up the stack to the file system filter 108, which will handle the I/O request in accordance with the methods described hereinafter.

As described above, each container has its own container namespace (e.g., a container volume), and thus, container 102(1) is associated with container namespace 112(1) and container 102(N) is associated with container namespace 112(N). Examples of a storage unit 110 include: a machine (e.g., a server), a disk, a platter, a sector, and so forth. In some instances, storage units can be arranged into a "rack" (e.g., a row) and multiple racks of storage units can be arranged into a "grid" of storage units (e.g., configured within a data center).

As further described herein, a container namespace can be formed, in part, by overlaying read-only files from a read-only namespace 114. Therefore, the read-only namespace 114 can include a set of files (e.g., executables, binaries, etc.) that individually can be shared across multiple different containers 102(1) . . . 102(N) and/or multiple different container namespaces 112(1) . . . 112(N). In various examples, the read-only namespace 114 can include one or more package layers, where each package layer can contain one or more files (e.g., files that can be expanded into an operating system directory). In FIG. 1 for example, a first package layer 116 can be associated with a base operating system (OS) layer of a host, a second package layer 118 can be associated with a runtime layer, and a third package layer 120 can be associated with an application layer.

To achieve high container density for the storage unit 110 (e.g., storing more container namespaces on an individual server and reducing the amount of storage typically used to store the container namespaces), FIG. 1 illustrates that container namespace 112(1) includes a placeholder file 122 and that container namespace 112(N) includes a placeholder file 124. In one example, a placeholder file can be created (e.g., by the file system filter 108) when a container opens a file in its container namespace (e.g., at a time after the container is launched). In another example, a placeholder file can be created in association with a container being launched (e.g., a set of placeholder files is created for a predetermined set of files in particular package layers). A placeholder file is a file that represents a shared file. However, the shared file contains the actual file data, and therefore, the placeholder file is smaller in size compared to the shared file because the placeholder file does not contain the actual file data contained in the shared file. Rather, the placeholder file only contains metadata of the shared file (e.g., security descriptors of the file, attributes of the file, extended attributes of the file, etc.). Consequently, a placeholder file is a representation of an actual file without the actual file data and the placeholder file is located in the file system (e.g., one of container namespaces 112(1) . . . 112(N)) that is accessed by the container (e.g., made accessible to the container).

Consequently, both placeholder file 122 and placeholder file 124 are instances of files that individually represent the same shared file 126 (e.g., each placeholder file contains metadata of the shared file 126). The file system filter 108 virtualizes the placeholder files 122, 124 for the containers 102(1) . . . 102(N). For example, when a container opens and/or accesses a file, the file system filter 108 provides access to file data that appears to come from the placeholder file (e.g., the file system filter 108 provides a container 102(1) with a view into its own container namespace 112(1)), but the file data is actually read from a shared location outside the container's own container namespace (e.g., a location within the read-only namespace 114). In various examples, due to the use of placeholder files, a container namespace is able to handle namespace operations (e.g., lock, exclusive read, exclusive write, etc.) while the file system filter 108 is tasked with redirecting input/output.

When the container 102(1) opens the placeholder file 122 in order to request to read data, the file system filter 108 passes the request to the container namespace 112(1) (e.g., to an input/output (I/O) stack of the container namespace 112(1)). The container namespace 112(1) then determines that the file to be opened is a placeholder file 122 based on an associated tag 127. In various examples, the tag 127 comprises a reparse point. The tag 127 indicates, to the container namespace 112(1), that another component outside the container namespace 112(1) is involved in the opening of the file and the container namespace 112(1) returns the tag 127 (e.g., a status reparse, an error code, etc.). The tag 127 ultimately is passed back up to the file system filter 108, and since the file system filter 108 owns the tag 127 (e.g., the file system filter 108 is the other component involved in the opening of the file), the file system filter 108 prepares to redirect read requests from container 102(1) to the shared file 126 in the read-only namespace 114, the shared file 126 corresponding to the placeholder file 122. In one example, the file system filter 108 prepares to redirect read requests by opening the shared file 126. With both the placeholder file 122 and the shared file 126 open, the file system filter 108 can redirect read requests from the placeholder file 122 to the shared file 126 such that it appears the read was performed on the placeholder file 122. Stated another way, the file data can be loaded for the container 102(1) from the shared file 126 in the read-only namespace 114, even though the container 102(1) thinks the file data is being loaded from the placeholder file 122 in its own container namespace 112(1).

In addition to redirecting accesses for read-only files, the file system filter 108 is also configured to ensure that a modification to a file is isolated to a specific container namespace associated with the container performing the modification. Stated another way, the file system filter 108 is configured to provide copy-on-write behavior for the container namespaces 112(1) . . . 112(N). For example, if container 102(N) writes to placeholder file 124 (e.g., attempts to modify file data it is configured to access via placeholder file 124), the placeholder file 124 is converted by the file system filter 108 into a fully populated file 128 that contains the actual file data. The file system filter 108 performs the conversion by populating the placeholder file 124 with the actual file data from the shared file 126 (e.g., the shared file 126 is loaded into the container namespace 112(N) and the write is performed). Since an access to this file within container namespace 112(N) no longer needs to be redirected to the shared file 126 in the read-only namespace 114, the file system filter 108 removes the associated tag 130 (e.g., a reparse point) from the fully populated file 128.

Consequently, the file system filter 108 is able to isolate any modifications so that they are specific and/or private to the container that performed the modifications to a file. This protects the integrity of the shared file 126 that is used by multiple different container namespaces 112(1) . . . 112(N). For instance, an access to placeholder file 122 via container namespace 112(1) is still redirected by the file system filter 108 to shared file 126, but an access to the corresponding file within container namespace 112(N) is not redirected by the file system filter 108 to the shared file 126 due to a modification and the copy-on-write behavior that creates the fully populated file 128 within container namespace 112(N).

In various examples, a location (e.g., layer) in which modifications to a file are made by a container can be referred to as a top layer or a scratch layer of a file system. The file system filter 108 captures any file data specific or private to the container in this top layer or scratch layer such that the modifications are isolated from other containers and/or container namespaces that operate in association with the storage unit 110 and/or a host entity.

In various examples, if a file is contained in more than one layer (e.g., multiple layers overlap), the file in an upper-most layer supersedes (e.g., the scratch layer or the application layer 120) any files in a lower layer (e.g., the base OS layer 116). A new layer can be generated by launching a container, running installers for the desired software and committing the changes. A layer can then be committed or installed (e.g., as a directory) on a container namespace, the read-only namespace, or a host namespace (e.g., a storage volume accessible to a host entity).

Accordingly, by leveraging the shared files in the read-only namespace 114, a higher container storage density for the storage unit 110 can be achieved. That is, rather than multiple container namespaces each including fully populated files that are the same, the multiple container namespaces can access a shared file via a location (e.g., the read-only namespace) external to their respective container namespaces as long as the shared file is only being read (and not written to).

In the illustration of FIG. 1, the read-only namespace 114 is illustrated as part of the storage unit 110. In other embodiments, the read-only namespace 114 may be maintained on a remote storage unit (not shown), such as a remote storage unit coupled to the local computing device via network. For example, the read-only namespace 114 may be maintained by a cloud storage service or provider.

FIGS. 2, 3, 5, and 6 individually illustrate an example process for employing the techniques described herein. The example processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device or a system to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

Figure 2:
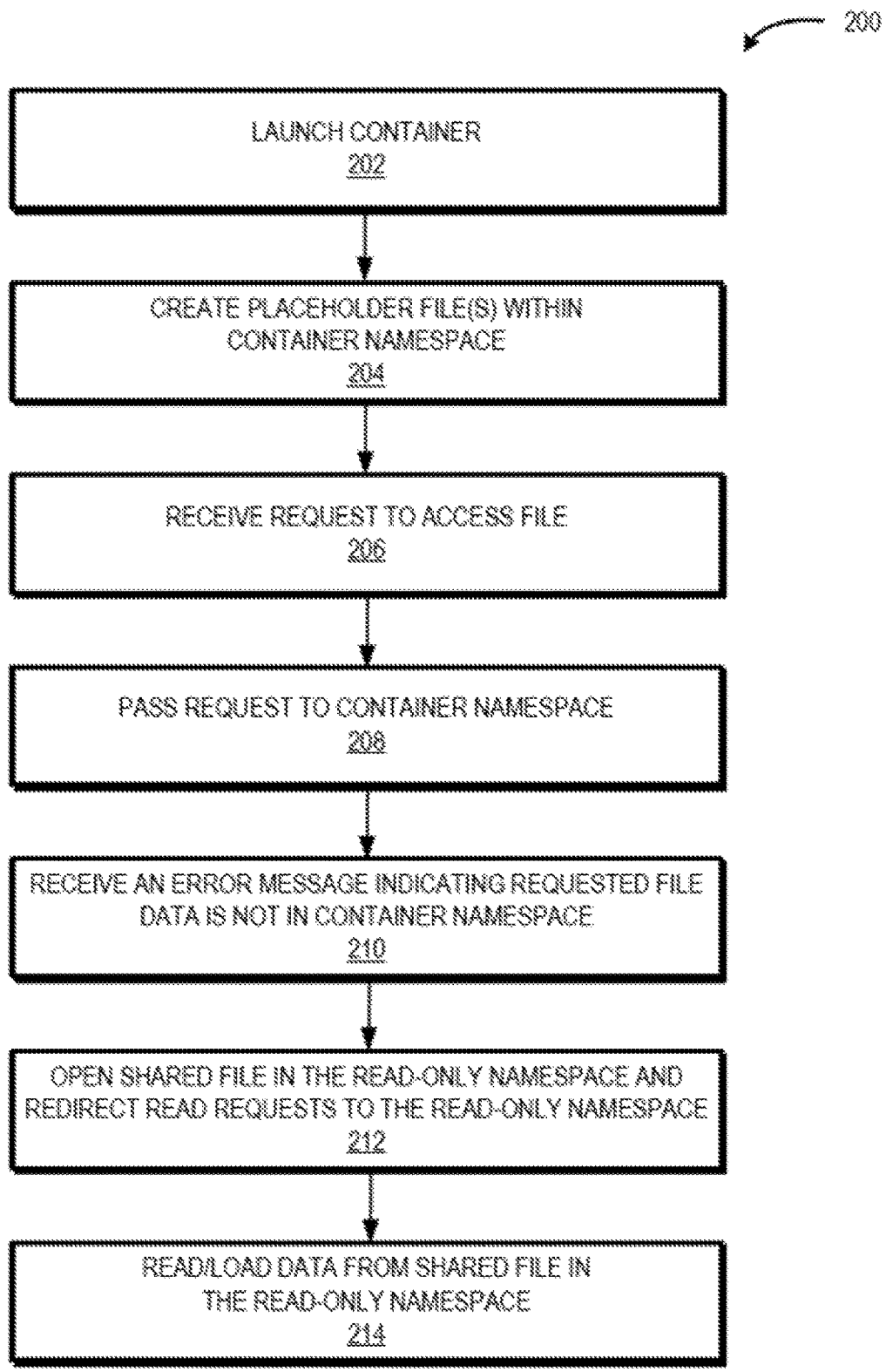
FIG. 2 is a flow diagram of an example process that redirects a file access for a container from the container's own container namespace to a read-only namespace.

FIG. 2 illustrates a flow diagram of an example process 200 that redirects a file access for a container from the container's own container namespace to a read-only namespace. The example process 200 can be implemented in association with the components illustrated in FIG. 1 (e.g., by the file system filter 108 operating in association with a host entity).

At 202, a container is launched. At 204, placeholder file(s) are created within the container's own container namespace, where the placeholder file(s) are associated with shared files (e.g., package layers for an operating system) to be accessed in read-only fashion. At 206, a request to access a file is received from the container (e.g., a request to read data). At 208, the request is passed to the container's own container namespace and a placeholder file is opened. At 210, a tag (e.g., an error message, a reparse status, etc.) is received from the container namespace indicating that the requested file data is not in the container's own container namespace (e.g., is not accessible via the opened placeholder file). At 212, a corresponding shared file in the read-only namespace is opened and read requests are redirected from the container namespace to the read-only namespace, the shared file being accessible to multiple different containers. At 214, the file data is read/loaded from the shared file in the read-only namespace.

As described above, a placeholder file can be created (e.g., by the file system filter 108) in response to a request from the container to access a file in its own container namespace (e.g., at a time after the container is launched). Alternatively, a placeholder file can be created in association with the launching of the container (e.g., a set of placeholder files is automatically created upon launch for a predetermined set of files in particular package layers).

Figure 3:
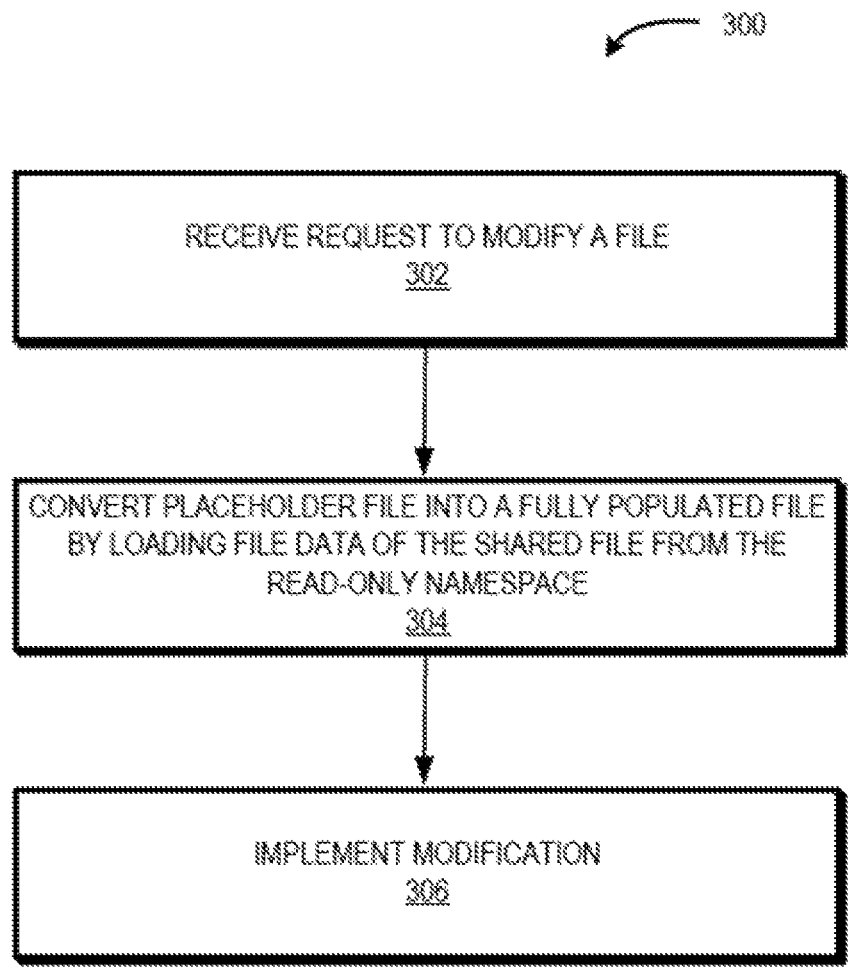
FIG. 3 is a flow diagram of an example process that handles a container's modification (e.g., a write) to a placeholder file stored in the container's own container namespace.

FIG. 3 illustrates a flow diagram of an example process 300 that handles a container's modification (e.g., a write) to a placeholder file stored in the container's own container namespace. The example process 300 can be implemented in association with the components illustrated in FIG. 1 (e.g., by the file system filter 108 operating in association with a host entity). Moreover, in various examples, the example process 300 can be implemented after the example process 200 of FIG. 2.

At 302, a request to modify a file is received from a container, where the file corresponds to a placeholder file in the container's own container namespace. At 304, the placeholder file associated with the request is converted into a fully populated file by loading the file data of the shared file from the read-only namespace to the container's own container namespace so the modification can be isolated. At 306, the modification to the fully populated file is implemented (e.g., a write is performed on the file data). To this end, the modified file data can subsequently be read by the container from the fully populated file in the container's own container namespace rather than from the shared file in the read-only namespace that is shared by multiple containers and that contains the unmodified file data.

Figure 4:
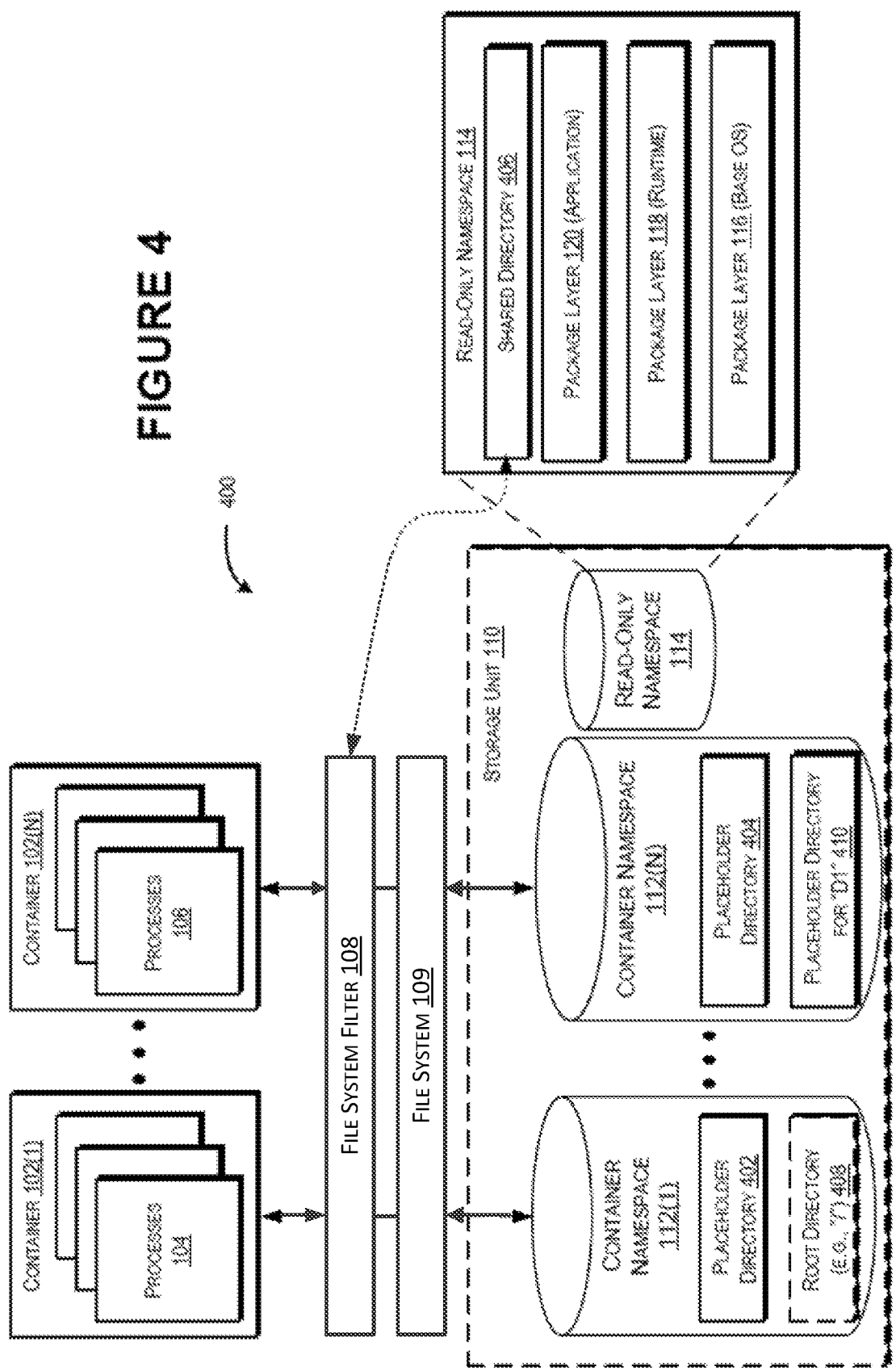
FIG. 4 is a block diagram depicting an example environment for creating placeholder directories in container namespaces.

FIG. 4 is a block diagram depicting an example environment, or virtualization system, 400 for creating placeholder directories in container namespaces. FIG. 4 is similar to FIG. 1 in that FIG. 4 illustrates the multiple containers 102(1) . . . 102(N), the file system filter 108, the respective container namespaces 112(1) . . . 112(N), and the read-only namespace 114. To conserve storage space, container namespace 112(1) includes a placeholder directory 402 and container namespace 112(N) includes a placeholder directory 404. A placeholder directory represents a corresponding shared directory 406. However, a placeholder directory has a capability of limiting the view into the contents of the directory, where the contents can include files, sub-directories, child directories, etc. For example, when a placeholder directory is enumerated, the file system filter 108 can merge the view of the placeholder directory (e.g., which may contain a placeholder file that has been opened in the container namespace) and the view of the corresponding shared directory (e.g., which may contain another file that has yet to be opened in the container namespace as described above with respect to FIG. 1).

For instance, placeholder directory 402 in container namespace 112(1) may reflect a root directory (e.g., the "/" directory) 408 (e.g., a parent node) that is not yet populated with contents (e.g., a child- or sub-directory "D1" that contains files and a child- or sub-directory "D2" that contains files). The placeholder directory 402 may only reflect the root directory (as referenced by 408) because the container 102(1) has not yet opened a file contained in "D1" and/or "D2", and thus a file accessible by a path that contains "D1" or "D2" has not yet been opened. Consequently, there may be no need to populate, in the container namespace 112(1), the placeholder root "/" directory with its contents from its corresponding shared directory 406 (e.g., the contents including "D1" and/or "D2" and the files contained therein). Rather, the file system filter 108 can enumerate the contents contained in the root "/" directory based on the corresponding shared directory 406 of the read-only namespace 114 (e.g., the shared root "/" directory).

However, for example, if the container 102(N) accesses a file in the read-only namespace 114 that exists in directory "D1" (e.g., a file in a package layer), the file system filter 108 populates the placeholder directory 404 (e.g., a root directory "/") of the container namespace 112(N) with a placeholder directory for "D1" 410, and the file system filter 108 further creates a placeholder file in the placeholder directory "D1" based on the access. Stated another way, placeholders for nodes of the directory that are along an access path are created. However, the file system filter 108 does not create a placeholder directory for "D2" in container namespace 112(N) since no files contained in "D2" have been accessed by the container 102(N).

Consequently, to conserve storage space, the file system filter 108 is configured to create and/or populate a placeholder directory for a respective container namespace, as needed (e.g., as files are accessed and opened).

The file system filter 108 is also configured to ensure that a modification to a placeholder directory is isolated to a specific container namespace associated with the container performing the modification. Stated another way, modifications, such as a rename or deletion of a placeholder directory or a placeholder file in a container namespace, are captured by fully populating a level (e.g., a direct parent directory containing the renamed or deleted placeholder directory or placeholder file). For instance, if shared directory "D1" contains five files, and container 112(N) renames a first placeholder file in the placeholder directory "D1", then the file system filter 108 fully populates or enumerates the placeholder directory "D1" 410 of the container namespace 112(N) with the other placeholder files for the second, third, fourth, and fifth files in the shared directory "D1". This fully expands placeholder directory "D1" 410 into a normal directory (e.g., with placeholder files representing its contents) and this expansion lets the container namespace 112(N) know that the first placeholder file has been renamed. The absence of a placeholder file in a fully expanded directory of a container namespace indicates that a file was deleted.

Figure 5:
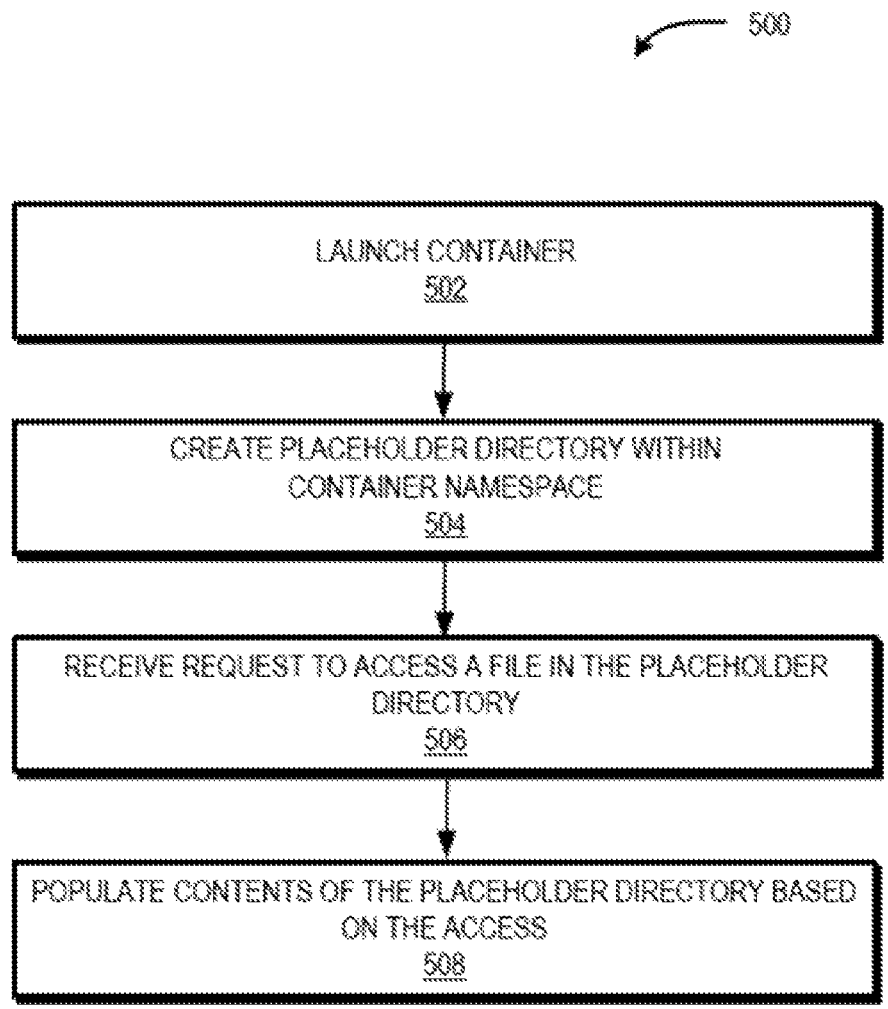
FIG. 5 is a flow diagram of an example process that creates a placeholder directory in a container namespace based on a shared directory of a read-only namespace.

FIG. 5 illustrates a flow diagram of an example process 500 that creates a placeholder directory in a container namespace based on a shared directory of a read-only namespace. The example process 500 can be implemented in association with the components illustrated in FIG. 4 (e.g., by the file system filter 108 operating in association with a host entity).

At 502, a container is launched. At 504, a placeholder directory is created within the container's own container namespace, where the placeholder directory is created based on a shared directory in a read-only namespace. At 506, a request to access a file in the placeholder directory is received from the container. At 508, contents of the placeholder directory are populated based on the access (e.g., placeholder child- or sub-directories and/or a placeholder file for the accessed file are populated within the initial placeholder directory). For example, if the container requests to open a file "F1" in a directory "D1" below the root directory, then the file system filter 108 populates the root directory with placeholder directory "D1" and a placeholder file "F1".

Figure 6:
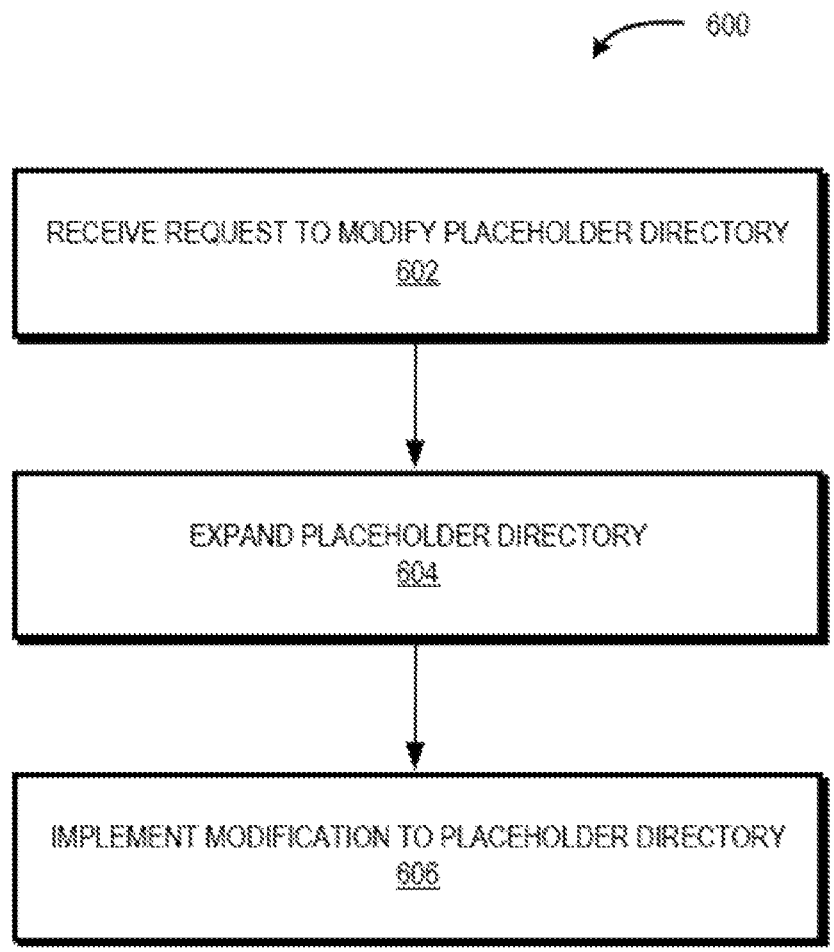
FIG. 6 is a flow diagram of an example process that handles a container's modification (e.g., a rename or a deletion) to a placeholder directory.

FIG. 6 illustrates a flow diagram of an example process 600 that handles a container's modification (e.g., a rename or a deletion) to a placeholder directory. The example process 600 can be implemented in association with the components illustrated in FIG. 4 (e.g., by the file system filter 108 operating in association with a host entity). Moreover, in various examples, the example process 600 can be implemented after the example process 500 of FIG. 5.

At 602, a request to modify the placeholder directory is received from a container (e.g., rename or delete a placeholder file or a child- or sub-placeholder directory). At 604, the placeholder directory that contains the placeholder file or the child- or sub-placeholder directory to be renamed or deleted is expanded and placeholders are created for the contents of the parent directory (e.g., placeholder files are created for the files other than the file in the placeholder directory being renamed or deleted). At 606, the modification to the placeholder directory is implemented (e.g., the placeholder file is renamed or deleted).

In various examples, the example processes described in FIGS. 5 and 6 may be implemented in association with the example processes described in FIGS. 2 and 3.

Figure 7:
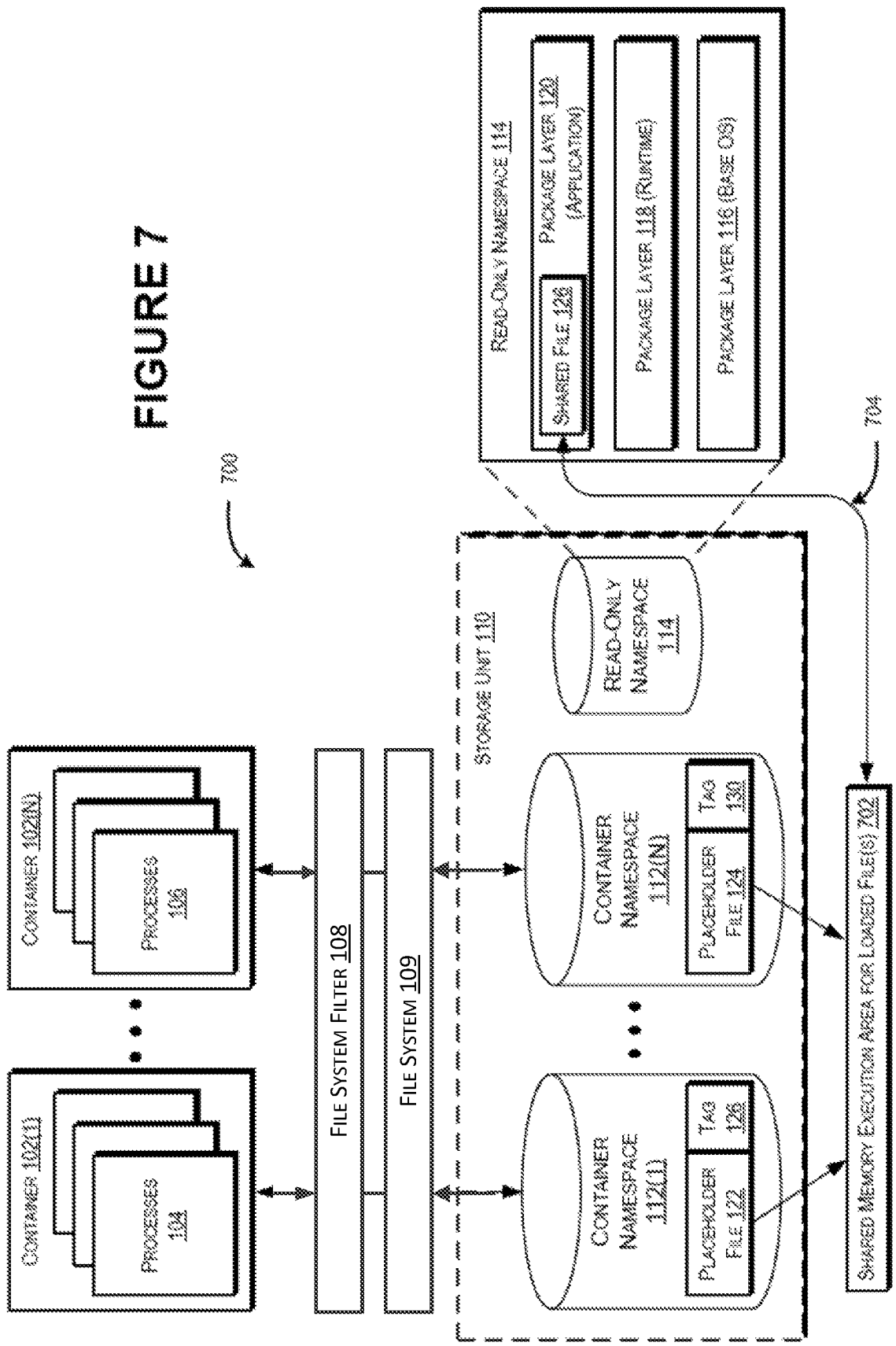
FIG. 7 is a block diagram depicting an example environment that uses a shared memory execution area for loaded files.

FIG. 7 is a block diagram depicting an example environment, or virtualization system, 700 that uses a shared memory execution area for loaded files. FIG. 7 is similar to FIGS. 1 and 4 in that FIG. 7 illustrates the multiple containers 102(1) . . . 102(N), the file system filter 108, the respective container namespaces 112(1) . . . 112(N), and the read-only namespace 114. To conserve storage space, FIG. 7 illustrates a shared memory execution area for loaded file(s) (e.g., shared files 126 accessed via the read-only namespace 114).

The example environment of FIG. 1, as described above, provides access to shared files (e.g., via the redirection performed by the file system filter 108). For execution, the shared files are loaded into memory and executed. In various examples, storage unit 110 is associated with main memory or persistent memory. However, the memory from which files are executed can be cache memory or run-time memory (e.g., RAM). Thus, FIG. 7 illustrates that multiple containers 102(1) . . . 102(N) can execute shared files from the same shared memory execution area 702 rather than their own private memory execution areas. For example, the file system filter 108, or a memory manager, can load shared files into the same shared memory execution area 702 that is pointed to by the respective container namespaces 112(1) . . . 112(N), but that is backed by a same copy of the shared files 126 in the read-only namespace 114 (as referenced by 704). However, if a container modifies a file to be executed (e.g., as described above with respect to FIGS. 1 and 3), then this process involving the shared memory execution area 702 is decoupled (e.g., halted), and execution of a modified file is associated with a private memory area specific to a container namespace.

In various examples, implementation of the shared memory execution area 702 may be associated with any one of the example processes described in FIGS. 2, 3, 5, and 6.

As discussed above, in the example virtualization systems illustrated and described above in FIGS. 1, 4, and 7, the state of a file is a combination of local state, typically small (e.g., a placeholder file), and some external source state such as that maintained in the read-only namespace 114 managed by a cloud provider or by another local file system, typically large. A file system filter driver, such as the file system filter 108, is responsible for overlaying the partial local state and the external source state into a single file system view that can be used by an application of a container (e.g., container 102(1)) as if the full state exists locally. For ease of description only, and without limitation, this functionality of the file system filter may be referred to as a "merge component." In this design, the underlying file system that is providing the actual storage is unaware it is hosting a virtualized overlay filesystem.

Figure 8:
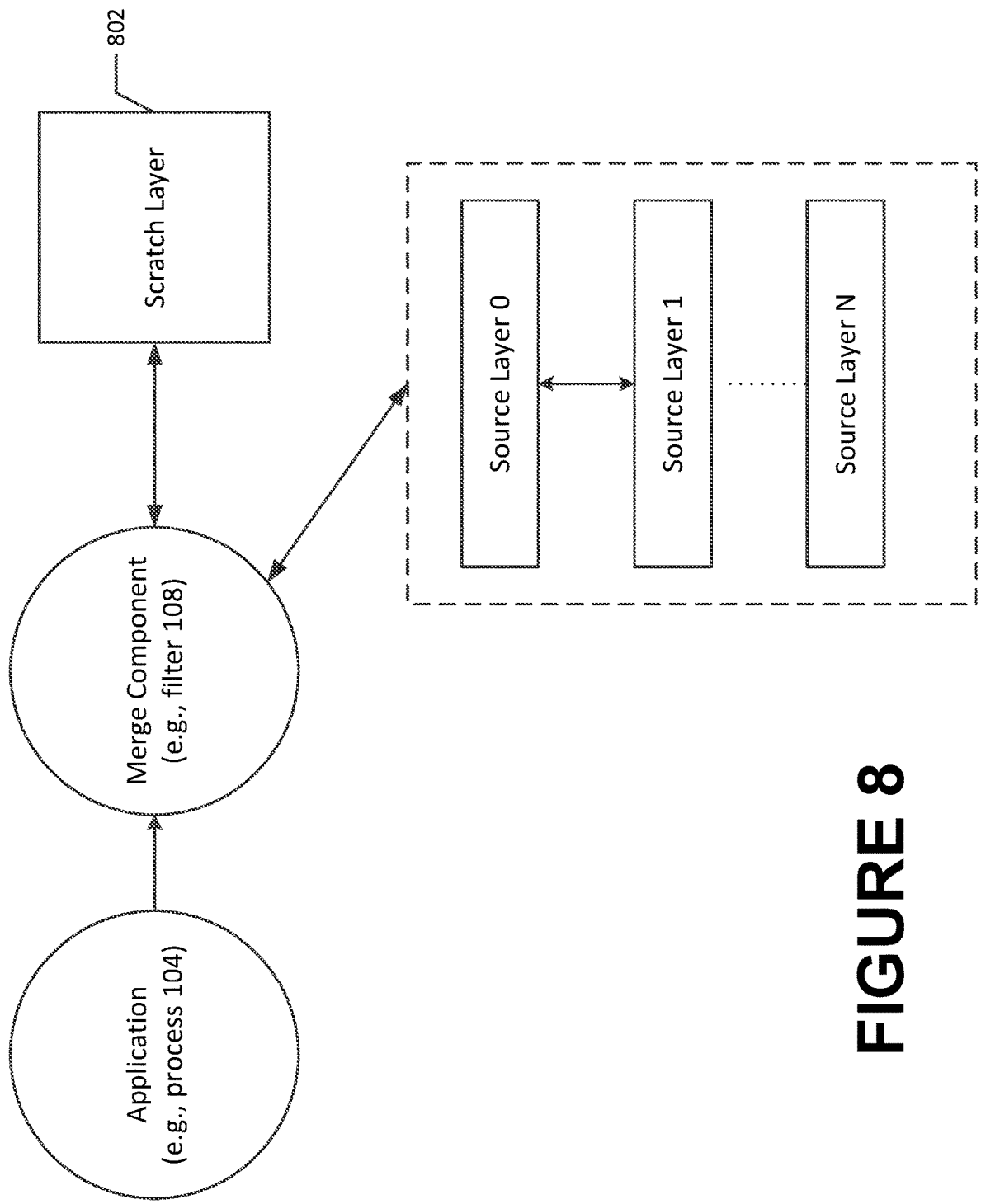
FIG. 8 illustrates an example of the processing by a merge component of a top (e.g., scratch) layer and individual source layers, in accordance with an aspect of the virtualization techniques disclosed herein.

Overlays that comprise the file system state may be referred to as "layers". Usually, the top layer is a local layer exposed to applications and users. It is a file system directory or full volume of a local file system. It is sometimes referred to as the "scratch layer," because it is sparsely populated with just enough state to capture modifications made by applications. When viewed from the application, however, this top layer appears to have a complete view of the entire file system state as if it existed locally. This view is an overlay of the top layer modifications and the individual source layers as shown in FIG. 8. In this example, there is a scratch layer 802 and a plurality of source layers 0, 1, . . . N.

To allow access to any source layer file via the top layer (scratch layer) the merge component populates a placeholder in the scratch layer 804 when the file is opened. In one implementation, placeholders are zero-filled sparse files with a reparse point and reparse point data that identifies the complete file backing the placeholder. The placeholder metadata, such as security descriptors, attributes and sizes are copied from the backing file. In this example implementation, the placeholder does not contain the file data. The placeholder is interpreted by the merge component to link the application visible file with the backing file in the source layer. Modifications, such as adding new files, deleting files, and renaming files, are reflected in the top layer. These changes may need to be stored permanently in the top layer or stored only temporarily until they can be reflected into the source layer(s). In some scenarios the source layers may be immutable so the top layer modifications are not reflected. In other scenarios, the source layers may be mutable and external changes may be expected to be reflected into the top layer.

This sparse population of the scratch layer has advantages for storage virtualization implementations (e.g., cloud providers) as well as for containers. In the case of storage virtualization, a user can access a huge directory tree from the cloud as if the entire tree exists locally in the scratch. For containers, hundreds of containers can run simultaneously on one system. Each container may have its own scratch layer but they all share the source layers. This achieves much higher storage density than is possible if each container has its own full set of files.

In addition to the aspects described above, mechanisms may be provided to record delete or rename modifications in the top file system layer. In one embodiment, the parent directory of a file being deleted may be converted to be a full directory. The absence of the deleted file then serves as record of its deletion. However, in this embodiment, once the directory is converted into a full directory, external changes in the lower layers of the directory are masked. Another embodiment, which will allow the top layer to continue to reflect changes in the lower layers while still recording delete and rename modifications, a tombstone mechanism may be employed.

In one embodiment of the tombstone mechanism, the merge component (e.g., file system filter 108) keeps track of all delete operations issued by an application and determines whether a tombstone is needed to record the delete. A tombstone may be needed if the file that is being deleted is present in the backing directory. If the file is not present in the backing directory (the file was newly created in the scratch layer), a tombstone may not be required since there is no file in the backing directory that needs to be masked by it. In the present embodiment, when the file system completes the delete, it notifies the merge component of the delete and a tombstone is created by the merge component in the scratch layer. Since there is a window between when the file is deleted according to the file system and when the tombstone is created and stored, the merge component should prevent any operation from accessing the layer file that was just deleted during this window. This may be done by recording the name of the deleted file in a table attached to its parent directory, and having operations on that file name wait behind the creation of the tombstone.

Rename operations may be implemented using tombstones as well. Tombstones may be used to mark the removal of the source file from the namespace. The rename is effectively treated as a delete of the source file and the creation of the new file. Note that the file system typically will not allow a rename if the target file name already exists. If a user wishes to rename a file to the name of an existing tombstone, the filesystem might fail that operation. To address this problem, the merge component may delete the tombstone before it allows the rename operation to proceed to the filesystem. However, if the rename operation fails for other reasons, the merge component should reinstate the tombstone.

On disk, tombstones may be implemented as empty files with a special tag associated with them. This tag indicates to the file system that this file (i.e., tombstone) is special and should be interpreted by the merge component rather than in the normal way when this file is attempted to be opened by an application. So, when the application attempts to open a deleted file, the filesystem will realize that the deleted file is represented by a file with this special tag (i.e., the tombstone) and will let the merge component handle this request. The merge component is then able to make this file appear deleted to the application. If a directory is deleted and an application attempts to open a file underneath that directory, the merge component may similarly be notified and given the chance to appropriately fail (or otherwise handle) the operation as if the file was actually deleted. In most cases, this may involve returning an error code to the application indicating that the file doesn't exist, but in certain cases could involve other operations.

One of these case is when the application attempts to create files with certain dispositions that depend on whether the file exists or not. For example, the application can issue an operation that opens a file of a certain name if it exists, otherwise it should create a new file with that name. In order to make it appear to the application that the tombstone is the equivalent of a deleted file, the merge component may notify the file system to supersede the tombstone with the file that the application wants to create. Such a supersede operation will ensure that there is no window in which both the tombstone and the new file don't exist. That situation could lead to cases where the masked file in the layer could be brought back if there are racing create operations.

Note, however, the creation of directories with the same name as existing directory tombstones cannot be handled by a supersede operation, because the filesystem typically would not allow that. Instead, in one embodiment, the merge component may delete the directory tombstone, store this state in memory, and then reissue the application's operation. If the operation fails, the merge component would then reinstate the tombstone in a manner similar to the rename case.

Another scenario in which the merge component may need to make tombstones appear deleted is directory enumeration. When an application queries the list of files in a directory, deleted files are not expected to be listed. But because the deleted files may be represented by tombstones, the file system may report these back to the application. To address this scenario, the merge component may intercept any such query and filter out all the tombstones, so that the illusion of deleted files is preserved. This may be accomplished by scanning the files returned by the file system for the special tombstone tag mentioned above and removing these results before returning them to the application.

As the foregoing illustrates, in the embodiments discussed above, tombstones may minimize the upfront cost of delete and rename operations, especially when those occur in large directories, because those operations involve creating placeholders for all files under that directory from the scratch layer and then marking the directory as full so that no modifications to the source layer directory show up in the scratch. Tombstones thus may allow the virtualization system to work with mutating layers, and may also improve the performance of these common operations.

So far, the description has focused on expanded source layers. Expanded layers have only full files and placeholders for all files contained in layers below. This ensures each source layer is a full representation of the merged contents of all lower layers. In this case, the merge component need only merge the top layer and the first source layer to construct a complete view. This has the benefit of simplicity but fully expanded source layers have the downside of requiring more storage, being slow to create and, perhaps most importantly, it masks future changes to lower layers. This can make it difficult to support software updates that may need to be applied to a lower source layer, such as an operating system base layer.

To address this, a mechanism is described by which a virtualization system may enable sparsely populated source layers that are merged dynamically. Each sparse layer may contain a partial view of the file system state. The files it contains may supersede the version of the same file in lower layers. The files in a sparse layer may be complete files, placeholders with metadata changes, or tombstones. Tombstones indicate a delete of the file has superseded the existence of the file in lower layers. The directories of a sparse layer may be full directories that completely supersede the directories in lower layers, placeholder directories that require merge with the lower layers, or tombstones that supersede the existence of the directory in lower layers.

In the embodiment described herein, it is assumed that a merge component, such as a file system filter 108, will itself merge the source layers. However, in other embodiments, some source provider may perform the merge of all the source layers and present a single source layer to the merge component so it can be merged with the top layer.

In the present embodiment, a merge component that is to merge sparse source layers is configured with an ordered list of sparse layer locations. When a file that is not already populated in the top layer is opened by an application, the merge component may first attempt to populate a placeholder in the top layer. This requires the merge component to locate the corresponding file in one of the source layers which may require a merge. If the merge component finds the file in the first source layer, the merge is complete and it will use that file metadata to populate a placeholder in the top layer. A handle to that placeholder may be returned to the application as if the placeholder was a complete file. In one embodiment, if the merge component encounters a reparse due to a directory reparse point (e.g., tag) in the source layer, it will check the reparse identifier (ID). If the ID indicates the directory is partial, the merge component must move to the next layer and try again. If the reparse point indicates it is a fully populated directory, then the file does not exist and the merge component must return the error to the application. If the merge component locates a directory or a file tombstone, it is similarly finished and must return the error to the application.

Another aspect of merging sparse layers involves directory enumeration. A directory enumeration operation involves a merge of the enumeration results of lower layers.

Every layer in the list is enumerated unless one of the layers indicates it is expanded. Layers below a non-sparse layer may be omitted since they have been superseded. Sparse directories may be identified by an ID in the reparse information in the same way as described for file open operations.

Conflicts may arise when sparse source layers are modified. When a scratch layer is populated with a placeholder for an unmodified version of a file from a lower layer, this placeholder is just a cache of the metadata and sizes of the source layer backing file. If the backing file changes while the merge component is offline, such as when a container is shutdown, this "cache" may become invalid. One way to handle this conflict is to run a tool when a layer changes and remove these placeholders before the merge component is brought back online. If the placeholder has been modified due to a metadata change, such as a file attribute or security descriptor, the placeholder is no longer just a cache and it can't be discarded. In that event, the merge component must handle the possibility that the file sizes of the placeholders are no longer in sync with the backing layer. The filter preferably will ensure these sizes are kept in sync. Note that if the merge component is online when the source layer modification occurs, the results may be unpredictable. The change may or may not be reflected in the top layer depending on the order that the modified files were accessed.

FIG. 9A is a block diagram depicting an example environment, or virtualization system 900, in which a file system filter 908 functions to virtualize the location of the scratch layer 802 of the virtualization system. For ease of description only, and without limitation, this functionality of the file system filter 908 may be referred to as a "namespace virtualization component" (NVC). Described hereinafter are further details of an implementation of the namespace virtualization component 908, in accordance with one embodiment thereof. Unlike the file system filter 108 depicted in FIGS. 1, 4, and 7 which virtualizes the contents of the scratch layer, the namespace virtualization component 908 virtualizes the location of that content.

Like FIGS. 1, 4, and 7, FIG. 9A illustrates multiple containers 102(1) . . . 102(N), where N represents a number of containers (e.g., run by a host computing device such as that shown for example in FIG. 10). Container 102(1) includes one or more processes 104 and container 102(N) includes one or more processes 106. FIG. 9A further illustrates the namespace virtualization component (NVC), which in the illustrated embodiment, may be implemented as a file system filter. The file system filter 908 may be part of a file system stack of a file system 109 and may be configured to perform special handling of certain input/output (I/O) calls. For example, an application (e.g., a process 104) may perform file operations (e.g., create, open, read, write) by invoking an appropriate I/O call via an application programming interface (API) of the file system 109 or underlying operating system of a computing device. These I/O calls will be passed to the file system's stack, which may comprise one or more file system filters, such as file system filter 908.

Each container may have its own container namespace, and thus, container 102(1) may be associated with container namespace 112(1) and container 102(N) may be associated with container namespace 112(N). These container namespaces may reside on a storage unit 110 of an underlying computing device. Examples of a storage unit 110 include: a machine (e.g., a server), a disk, a platter, a sector, and so forth. In some instances, storage units can be arranged into a "rack" (e.g., a row) and multiple racks of storage units can be arranged into a "grid" of storage units (e.g., configured within a data center).

As described above, the namespace virtualization component 908 functions to virtualize the location of a scratch layer. Again for ease of description only, and without limitation, the following terminology will be employed herein. A virtualization root (VR) refers to a root of a folder hierarchy that is projected into the namespace of the container. A scratch root refers to a root of the scratch layer for a container. Layer roots refers to the ordered list of layers that form the read-only portion of the view that is backing the scratch layer. Note that all of these locations physically exist on disk. The namespace virtualization mechanism does not materialize a "root" where none exists on the underlying storage device. FIG. 9B graphically illustrates the relationship between a virtualization root 902, scratch root 904, and layer roots 906.

As shown in FIG. 9B, the virtualization root 902 is what is projected into the namespace of the container. The namespace virtualization component 908 redirects I/O calls targeted to the virtualization root, and its descendants in the context of the container, to the scratch root 904. The namespace virtualization component 908 also projects the correct names for the scratch root and its descendants such that entities above perceive them to be in the virtualization root in the context of the container. A copy-on-write component, which may also be part of the file system filter 908 or may be part of a separate file system filter or other module, may be used to provide copy-on-write behavior between the layer roots 906 and the scratch root 904.

In order to perform its namespace virtualization function, the namespace virtualization component 908 may be configured with one or more mappings. In one embodiment, a mapping consists of a virtualization root (VR), a virtualization target root (VTR), zero or more virtualization exception roots (VER), and an indication of a desired isolation mode. In one embodiment, the mappings are stored in a table accessible by the namespace virtualization component 908. This mapping table may be made accessible, or be fed, to the namespace virtualization component 908 every time the virtualization system starts. Further details of each field of a mapping is provided in the following Table 1:

TABLE 1

Data Structure for Mapping

| | |
|---|---|
| Virtualization Root Path (VR Path) | The source directory of a mapping. Opens that traverse the VR are mapped. |
| Virtualization Target Root Path (VTR Path) | The destination directory of a mapping. This location is the same as the Scratch Root in FIG. 9 (i.e. "VTR" and "Scratch Root" are synonymous). |
| Virtualization Exception Root (VER) | A directory that is a descendant of a VR that is not subject to the mapping. For example, if C:\Windows is a VR, and C:\Windows\System32 is a VER, then opens at C:\Windows\System32 or below do not get mapped. Any other open in C:\Windows does get mapped. |
| Isolation Mode | A description of the level of thoroughness of virtualization that the NVC provides. In the present embodiment, each mapping in a container has an isolation mode, established when the mapping is configured, and the container as a whole has an isolation mode. The NVC determines the isolation mode of a container based on the mappings that have been configured. |

In the present embodiment, two isolation modes are supported, which are referred to as "soft" isolation and "hard" isolation, respectively.

In soft isolation mode, the namespace virtualization component 908 causes file opens (i.e., I/O calls to open a file) to be "reparsed", i.e. re-issued with a new file path. In this mode, subsequent operations, such as file name queries see what was actually opened (i.e. they see VTR paths instead of VR paths); various operations are not virtualized. This mode can also be thought of as a "redirection mode." The namespace virtualization component 908 just reparses opens that are along VR paths. It makes no effort to hide the real locations of things the caller opens. However, it does suppress information that would present paths to the caller that the caller cannot do anything with. For example, the namespace virtualization component 908 may suppress names of hard links that are under virtualization roots, whether hard or soft isolation, because they are inaccessible to the caller.

In hard isolation mode, the namespace virtualization component 908 redirects opens rather than reparsing them. The namespace virtualization component 908 handles operations such as name queries so that callers only see VR paths, not VTR paths, and certain operations are virtualized while others are blocked. The namespace virtualization component 908 tries to maintain the illusion that the locations the caller thinks it opened are what were really opened.

In one implementation of hard isolation mode, the namespace virtualization component 908 may fail operations that are not commonly performed because they are hard to implement. The namespace virtualization component 908 may rely on telemetry to know how common these operations are actually performed by users. If the frequency of use of those operations changes, the namespace virtualization component 908 may adjust its handling of those operations.

FIG. 9C illustrates one embodiment of a process of redirecting a file-open I/O call from a virtualization target to a virtualization target root. In this embodiment, the process may involve two phases, a "pre-open" phase and a "post-open" phase.

As shown in FIG. 9C, a file-open I/O call is received from an application in step 952. In the pre-open phase, if the file-open I/O call received from the application is not in the context of a container, then in step 956, the namespace virtualization component 908 will simply pass it through to the file system for handling.

If the file-open I/O call is in the context of a container, then at step 958, the namespace virtualization component 908 will look up the directory path of the file provided by the calling application in the mapping table. If the path is not in the mapping table, or if its mapping contains a virtualization exception root, then in step 956 the I/O call will be passed through to the file system. But if the path is at or under a virtualization root, the mapping table lookup returns <VR Path, VTR Path, Isolation Mode> and control passes to step 962 to determine whether hard or soft isolation mode is indicated.

If hard isolation mode is indicated, then in step 964 the namespace virtualization component 908 will replace the <VR Path> portion of the file name of the file with <VTR Path> in the file-open I/O call. Then, in step 966, the namespace virtualization component 908 will then create a context containing <VR Path, VTR Path> (hereinafter referred to as a "handle context"), associate it with the I/O call, and will then pass the I/O call through to the file system.

If, however, the soft isolation mode is indicated, then in step 968, the namespace virtualization component 908 replaces the <VR Path> portion of the file name of the file with <VTR Path>. Then, in step 970, the namespace virtualization component 908 will return a special return code (for example, in one embodiment, "STATUS REPARSE") that will cause the file-open I/O call to be restarted using the new path. When the open comes back into the namespace virtualization component 908, the namespace virtualization component 908 will know that it already processed it in this manner and will ignore it. It is this method of operation that makes it so that the "real" names of files opened in soft isolation are revealed to the caller. Since the open was reparsed, it was reissued with the "real" name, so queries of the open file show the "real" name. Note that reparsing means that in soft isolation mode none of the post-create phase takes place.

At this point either the hard isolation described above was performed (i.e., the name was re-written and the open operation allowed to proceed), or the soft isolation described above was performed (i.e., the name was rewritten and the open restarted with the new name). The file system 109 will then open the file at the specified path and then pass the call back up with an open handle to the file. In the case of hard isolation, the namespace virtualization component will perform a post-open phase.

In the post-open phase, at step 972, the namespace virtualization component 908 associates the context containing <VR Path, VTR Path> with the open file. The namespace virtualization component 908 is now finished processing the file-open I/O call.

One embodiment of a process of handling rename of a file is described hereinafter. A rename operation consists of a rename I/O call performed on a file, accompanied by a buffer containing the new destination pathname to apply to the file, which in one case consists of the full path of the new file name from the root of the volume.

In this case, if the rename I/O call is not in the context of a container, the namespace virtualization component 908 will simply pass it through to the file system 109 for handling. Otherwise the namespace virtualization component 908 looks up the new destination pathname in the mapping table to retrieve <VR Path, VTR Path>.

If the mapping table does not contain a mapping for the new name, the rename I/O operation is passed through to the file system 109.

If the mapping table does contain a mapping, the namespace virtualization component 908 modifies the new destination pathname by replacing its <VR Path> portion with <VTR Path>. The namespace virtualization component 908 then issues a rename I/O call using the modified destination pathname. When that I/O call returns to the namespace virtualization component 908, it completes processing of the original rename I/O call.

In one embodiment, in the context of projecting virtualized names for a VTR, the namespace virtualization component 908 handles name query I/O operations that return a full path. Name query operations consist of three phases: a pre-query where the namespace virtualization component 908 may perform processing, servicing of the name query I/O operation by the file system, and a post-query where the namespace virtualization component 908 may perform further processing.

In a pre-query phase of a name query I/O operation, the namespace virtualization component 908 checks for a handle context created when processing the file-open I/O call. The presence of this handle context indicates that the file was opened through a hard-isolation mapping (soft-isolation opens have no handle context, therefore they "leak" the VTR name through to the caller by design). If no handle context is present, the namespace virtualization component 908 passes the name query I/O operation to the file system and does no further processing. Otherwise, in the post-query phase of the name query I/O operation, the namespace virtualization component 908 uses the mapping data stored in the handle context to modify the file name so that it appears to be in the VR path. After performing this substitution, the namespace virtualization component 908 replaces the path returned by the file system with the new path and returns to the caller.

In an embodiment, the namespace virtualization component 908 may filter the output in the post-query phase of the name query operation. For example, for each name returned by the file system, the namespace virtualization component 908 may look up the parent directory's name in the mapping table. If the parent directory is not in a mapping, the name can be returned. If the parent directory is in a mapping, but it is also in the virtualization target root for that mapping, the name can be returned. If the parent directory is in a mapping, and it is not in the virtualization target root for that mapping, the namespace virtualization component 908 suppresses the name in the results of the name query I/O operation. Note also that the link names may be suppressed whether the mapping they are in is for hard or soft isolation. One reason to do this is because names should not be presented to the caller that the caller cannot do anything with. In some implementations, it may be acceptable to leak VTR names to callers, but not names that cannot be used.

Preferably, the namespace virtualization component 908 disallows modification of the name of any component of a virtualization root, virtualization target root, and virtualization exception root when the virtualization is active. In one embodiment, the namespace virtualization component 908 may achieve this by maintaining open file handles to the several roots.

In accordance with another aspect of the namespace virtualization techniques described herein, depending on the isolation mode certain operations may be blocked when there are namespace virtualization component 908 mappings. There are two broad categories of operations that may be blocked, delineated by the reason they are blocked.

The first category are operations that may be blocked because such operations should not be allowed in a virtualization system of the type described herein, such as manipulating storage quotas or getting file extents from the underlying file system. A second category are operations that may be blocked because they are complex to implement and/or would impose significant runtime cost. These are the operations that may be considered for implementation if telemetry indicates that their omission presents significant user problems.

Note that depending on the implementation, certain operations that have full-volume scope may be challenging, and how they are handled may depend on the specific implementation.

FIG. 10 illustrates an example computing device 1012 in which the techniques and solutions disclosed herein may be implemented or embodied. The computing device 1012 may be any one of a variety of different types of computing devices, including, but not limited to, a computer, personal computer, server, portable computer, mobile computer, wearable computer, laptop, tablet, personal digital assistant, smartphone, digital camera, or any other machine that performs computations automatically.

The computing device 1012 includes a processing unit 1014, a system memory 1016, and a system bus 1018. The system bus 1018 couples system components including, but not limited to, the system memory 1016 to the processing unit 1014. The processing unit 1014 may be any of various available processors. Dual microprocessors and other multiprocessor architectures also may be employed as the processing unit 1014.

The system bus 1018 may be any of several types of bus structure(s) including a memory bus or memory controller, a peripheral bus or external bus, and/or a local bus using any variety of available bus architectures including, but not limited to, Industry Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computing device 1012, such as during start-up, is stored in nonvolatile memory 1022. By way of illustration, and not limitation, nonvolatile memory 1022 may include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computing device 1012 also may include removable/non-removable, volatile/non-volatile computer-readable storage media. FIG. 10 illustrates, for example, a disk storage 110. Disk storage 110 includes, but is not limited to, devices like a magnetic disk drive, floppy disk drive, tape drive, Jaz drive, Zip drive, LS-100 drive, memory card (such as an SD memory card), or memory stick. In addition, disk storage 110 may include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 110 to the system bus 1018, a removable or non-removable interface is typically used such as interface 1026.

FIG. 10 further depicts software that acts as an intermediary between users and the basic computer resources described in the computing device 1012. Such software includes an operating system 1028. Operating system 1028, which may be stored on disk storage 110, acts to control and allocate resources of the computing device 1012. Applications 1030 take advantage of the management of resources by operating system 1028 through program modules 1032 and program data 1034 stored either in system memory 1016 or on disk storage 110. It is to be appreciated that the aspects described herein may be implemented with various operating systems or combinations of operating systems. As further shown, the operating system 1028 includes a file system 109 for storing and organizing, on the disk storage 110, computer files and the data they contain to make it easy to find and access them.

A user may enter commands or information into the computing device 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computing device 1012, and to output information from computing device 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computing device 1012 may operate in a networked environment using logical connections to one or more remote computing devices, such as remote computing device(s) 1044. The remote computing device(s) 1044 may be a personal computer, a server, a router, a network PC, a workstation, a microprocessor based appliance, a peer device, another computing device identical to the computing device 1012, or the like, and typically includes many or all of the elements described relative to computing device 1012. For purposes of brevity, only a memory storage device 1046 is illustrated with remote computing device(s) 1044. Remote computing device(s) 1044 is logically connected to computing device 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 150 is shown for illustrative clarity inside computing device 1012, it may also be external to computing device 1012. The hardware/software necessary for connection to the network interface 1048 includes, for exemplary purposes only, internal and external technologies such as modems including regular telephone grade modems, cable modems and DSL modems, ISDN adapters, and Ethernet cards.

As used herein, the terms "component," "system," "module," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

The various illustrative logical blocks, configurations, modules, and method steps or instructions described in connection with the aspects disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the present disclosure.

The various illustrative logical blocks, configurations, modules, and method steps or instructions described in connection with the aspects disclosed herein, or certain aspects or portions thereof, may be embodied in the form of computer executable instructions (i.e., program code) stored on a computer-readable storage medium which instructions, when executed by a machine, such as a computing device, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The description of the aspects is provided to enable the making or use of the aspects. Various modifications to these aspects will be readily apparent, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A computing system comprising:
one or more processors;
memory;
a storage unit comprising a container namespace associated with a container defined within the computing system, the container having exclusive access to files stored within the container namespace;
a file system executing on the one or more processors; and
a namespace virtualization component comprising computer-executable instructions stored in the memory which, when executed by the one or more processors, performs operations comprising:
receiving from an application executing on the one or more processors an input/output (I/O) call requesting an operation on a file, the received I/O call including a directory path of the file within a first directory hierarchy that is projected into the namespace of the container;
determining, based on a data structure that maps each of a plurality of directory paths of the first directory hierarchy to a corresponding target directory path of a second directory hierarchy within the container namespace, a target directory path of the second directory hierarchy, the data structure indicating, for each mapping of a directory path of the first directory hierarchy to a corresponding target directory path of the second directory hierarchy, whether the target directory path is to be hidden from the application from which the I/O call was received;
replacing the directory path of the file in the I/O call with the target directory path determined based on the data structure; and
passing the I/O call including the target directory path for the file to the file system of the computing system.

2. The computing system of claim 1, the target directory path of the second directory hierarchy corresponding to a scratch layer of the second directory hierarchy, the scratch layer of the second directory hierarchy containing a placeholder for the file.

3. The computing system of claim 1, the target directory path of the second directory hierarchy corresponding to a scratch layer of the second directory hierarchy, the scratch layer of the second directory hierarchy being backed by one or more source layers within the first directory hierarchy.

4. The computing system of claim 1, the replacing of the directory path of the file in the I/O call with the target directory path being hidden from the application and appearing to the application as if the I/O call were performed on the file within the first directory hierarchy.

5. The computing system of claim 1, the data structure comprising a table, and the determining the target directory path comprising:
searching, in the table, for at least a portion of the directory path of the file included in the I/O call; and
upon locating the at least a portion of the directory path of the file in the table, retrieving from the table the target directory path associated with the at least a portion of the directory path of the file included in the I/O call.

6. The computing system of claim 1, the data structure indicating, for one or more directories that are descendants of a first root directory of the first directory hierarchy, that no mapping is to be performed for those one or more descendant directories of the first root directory.

7. The computing system of claim 1, the namespace virtualization component comprising a file system filter of the file system of the computing system.

8. A method implemented in a computing system comprising one or more processors, memory, and a storage unit comprising a container namespace associated with a container defined within the computing system, the container having exclusive access to files stored within the container namespace, the method comprising:
receiving from an application executing on the one or more processors an input/output (I/O) call requesting an operation on a file, the received I/O call including a directory path of the file within a first directory hierarchy that is projected into the namespace of the container;
determining, based on a data structure that maps each of a plurality of directory paths of the first directory hierarchy to a corresponding target directory path of a second directory hierarchy within the container namespace, a target directory path of the second directory hierarchy, the data structure indicating, for each mapping of a directory path of the first directory hierarchy to a corresponding target directory path of the second directory hierarchy, whether the target directory path is to be hidden from the application from which the I/O call was received;
replacing the directory path of the file in the I/O call with the target directory path determined based on the data structure; and
passing the I/O call including the target directory path for the file to a file system of the computing system.

9. The method of claim 8, the target directory path of the second directory hierarchy corresponding to a scratch layer of the second directory hierarchy, the scratch layer of the second directory hierarchy containing a placeholder for the file.

10. The method of claim 8, the target directory path of the second directory hierarchy corresponding to a scratch layer of the second directory hierarchy, the scratch layer of the second directory hierarchy being backed by one or more source layers within the first directory hierarchy.

11. The method of claim 8, the replacing of the directory path of the file in the I/O call with the target directory path being hidden from the application and appearing to the application as if the I/O call were performed on the file within the first directory hierarchy.

12. The method of claim 8, the data structure comprising a table, and the determining the target directory path comprising:
searching, in the table, for at least a portion of the directory path of the file included in the I/O call; and
upon locating the at least a portion of the directory path of the file in the table, retrieving from the table the target directory path associated with the at least a portion of the directory path of the file included in the I/O call.

13. The method of claim 8, the data structure indicating, for one or more directories that are descendants of a first root directory of the first directory hierarchy, that no mapping is to be performed for those one or more descendant directories of the first root directory.

14. A computer-readable storage medium storing computer-executable instructions, which when executed by one or more processors of a computing system, cause the computing system to perform operations comprising:
receiving from an application executing on the one or more processors an input/output (I/O) call requesting an operation on a file, the received I/O call including a directory path of the file within a first directory hierarchy that is projected into a container namespace on a storage unit of the computing system, the container namespace being associated with a container defined within the computing system that has exclusive access to files stored within the associated container namespace;

determining, based on a data structure that maps each of a plurality of directory paths of the first directory hierarchy to a corresponding target directory path of a second directory hierarchy within the container namespace, a target directory path of the second directory hierarchy, the data structure indicating, for each mapping of a directory path of the first directory hierarchy to a corresponding target directory path of the second directory hierarchy, whether the target directory path is to be hidden from the application from which the I/O call was received;

replacing the directory path of the file in the I/O call with the target directory path determined based on the data structure; and passing the I/O call including the target directory path for the file to a file system of the computing system.

15. The computer-readable storage medium of claim 14, the data structure comprising a table, and the determining the target directory path comprising:

searching, in the table, for at least a portion of the directory path of the file included in the I/O call; and upon locating the at least a portion of the directory path of the file in the table, retrieving from the table the target directory path associated with the at least a portion of the directory path of the file included in the I/O call.

16. The computing system of claim 1, the target directory path of the second directory hierarchy corresponding to a scratch layer of the second directory hierarchy, the scratch layer being sparsely populated with state data to capture modifications made by applications.

17. The method of claim 8, the target directory path of the second directory hierarchy corresponding to a scratch layer of the second directory hierarchy, the scratch layer being sparsely populated with state data to capture modifications made by applications.

18. The computer-readable storage medium of claim 14, the target directory path of the second directory hierarchy corresponding to a scratch layer of the second directory hierarchy, the scratch layer being sparsely populated with state data to capture modifications made by applications.

* * * * *